United States Patent [19]

Narayanan et al.

[11] 3,910,942

[45] Oct. 7, 1975

[54] ANTHELMINTIC (ISOTHIOCYANOPHENYL) OXADIAZOLES

[75] Inventors: Venkatachala L. Narayanan, Hightstown; Anthony Joseph Martinez, Princeton; Rudiger D. Haugwitz, Titusville, all of N.J.

[73] Assignee: E. R. Squibb & Sons, Inc., Princeton, N.J.

[22] Filed: July 11, 1974

[21] Appl. No.: 487,497

Related U.S. Application Data

[63] Continuation-in-part of Ser. No. 347,313, April 2, 1973, abandoned.

[52] U.S. Cl..... 260/307 G; 260/544 L; 260/544 M; 260/544 Y; 260/546; 260/562 R; 260/564 G; 424/272

[51] Int. Cl.² ........................................ C07D 271/06
[58] Field of Search ................................ 260/307 G

[56] References Cited
UNITED STATES PATENTS 3,853,893  12/1974  Narayanan et al. .......... 260/294.8 E

*Primary Examiner*—Raymond V. Rush
*Attorney, Agent, or Firm*—Lawrence S. Levinson; Merle J. Smith; Stephen B. Davis

[57] ABSTRACT (Isothiocyanophenyl) oxadiazoles and related compounds and their methods of preparation are disclosed. In addition, useful compositions and methods for employing said compositions as anthelmintics are taught.

13 Claims, No Drawings

ANTHELMINTIC (ISOTHIOCYANOPHENYL) OXADIAZOLES

This application is a continuation-in-part of Ser. No. 347,313 filed on Apr. 2, 1973, now abandoned.

This invention relates to compounds of the formula:

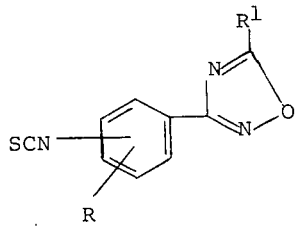

I wherein
R is hydrogen, lower alkyl, aryl, halogen, trifluoromethyl, lower alkoxy, aryloxy, di(lower alkyl)amino and lower alkyl

$R^1$ is hydrogen, lower alkyl, cycloalkyl, aryl, halo-lower alkyl, and adamantyl.

In addition, this invention encompasses the methods for preparing said (isothiocyanophenyl)oxadiazoles, compositions containing said (isothiocyanophenyl)oxadiazoles and methods for using said compositions as anthelmintic agents.

Lastly, this invention is intended to also include the intermediates utilized in preparing said anthelmintic (isothiocyanophenyl) oxadiazoles.

The term "aryl" is intended to include phenyl, naphthyl, substituted phenyl wherein said substituent may be one or more of fluoro, chloro, bromo, iodo, nitro, trifluoromethyl, lower alkyl and lower alkoxy.

The term "lower alkyl" is intended to mean a straight or branched hydrocarbon fragment of from one to ten carbon atoms, preferably 1 to 4, such as methyl, propyl, t-butyl, etc.

Cycloalkyl includes ring systems of 3 to 6 carbon atoms such as cyclopropyl, cyclopentyl, cyclohexyl, etc.

The term "lower alkoxy" is intended to mean a lower alkyl group linked through a single bond to oxygen.

The term "halo or halogen" is intended to mean "chloro" or "bromo."

The compounds of this invention are prepared in the following manner.

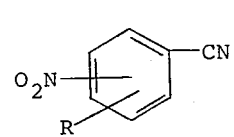

II

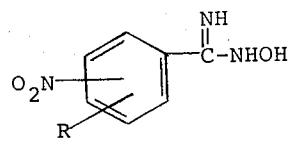

III

The nitrobenzonitriles of formula II are converted to amidoximes of the formula III by treatment with an acid salt of hydroxylamine, such as the hydrochloride, sulfate or phosphate in the presence of an acid acceptor, such as sodium or potassium carbonate. The reaction is generally conducted in an aqueous or non-aqueous alcohol solvent of up to four carbon atoms at from about room temperature to the reflux temperature of the solvent for periods of from one to 48 hours, preferably about 24 hours.

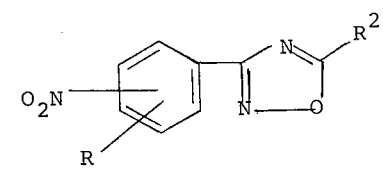

IV $R^2$ is hydrogen, lower alkyl, cycloalkyl, aryl, dihalo-lower alkyl, trihalo-lower alkyl, halo-lower alkyl or adamantyl.

The amidoximes of the formula III are converted to the oxadiazoles of the formula IV wherein $R^2$ is hydrogen by a variety of methods.

a. An amidoxime of the formula III is dissolved in an excess of tri(lower alkyl)orthoformate, preferably triethyl, and heated between about 100°C to about 146°C for about 0.5 to about 24 hours. The product of the formula IV, either precipitates out, and is separated by filtration, or the excess tri(lower alkyl)orthoformate is removed and the product washed with an organic solvent, such as petroleum ether.

b. An amidoxime of the formula III is heated to about 100°C with about an equimolar quantity of formic acid for from about one half a minute to ten minutes.

c. An amidoxime of the formula III is cyclized by reaction with two molar equivalents of a complex of dimethylformamide-phosphorus oxychloride in an ether such as tetrahydrofuran, diethyl ether, etc. at temperatures of from about −10° to about room temperature for from one minute to three hours. After removal of the solvent and washing with water, the desired compound of formula IV is obtained.

d. An amidoxime of the formula III is dissolved in an inert organic solvent, preferably an ether, at depressed temperatures (about −10°C to about 10°C) and reacted with a mixed anhydride of the formula

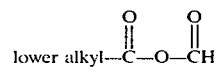

and stirred for a period of from about five minutes to about three hours.

Oxadiazoles of the formula IV wherein $R^2$ is lower alkyl, cycloalkyl, adamantyl, halo-lower alkyl, dihalo-lower alkyl, trihalo-lower alkyl and aryl are prepared by heating a compound of the formula:

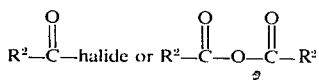

with a compound of formula III.

In many instances the acylating agent may be used in excess thus also serving as the solvent medium; however, generally an inert organic solvent, such as benzene or ether is employed. The temperature range generally employed is either the refluxing temperature of the solvent or about 100°C whichever is the lesser, and the time ranges from about a few minutes to about eighteen hours. This reaction is preferably conducted in the presence of a catalytic amount of $BF_3$-etherate.

Compounds of the type IV are converted to those of the formula V in poor yield, utilizing reducing agents such as $PtO_2/H_2$, $Na_2S_2O_4/CH_3OH$, $Pd/H_2$, $N_2H_4$ and Pd/C.

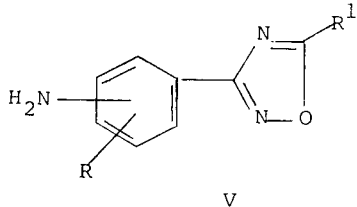

V

The compounds of formula IV wherein $R^2$ is dihalo-lower alkyl or trihalo-lower alkyl when reduced yield the compounds of formula V wherein $R^1$ is halo-lower alkyl. In all other cases, the reduction of compounds of formula IV yields the corresponding compounds of formula V, i.e. $R^2=R^1$.

Surprisingly, catalytic reduction using about 5% Pd/C in the presence of about 2-5 equivalents of an acid, such as hydrochloric acid or sulfuric acid, gives good yields of amino compounds.

The conversion of the amines of formula V into the (isothiocyanophenyl)oxazoles (I) of this invention may be achieved by reacting the amine with:

a.

in a relatively non-polar solvent, such as chloroform, ether, tetrahydrofuran, etc., preferably in the presence of an acid acceptor, such as calcium carbonate, trimethylamine, etc. at temperatures from 0° to 60°C. More specific reaction procedures are disclosed in Houben-Weyl, 4th Edition, Vol. 9, pages 867 and 88 (1955) and the use of acid binding agents is disclosed in Arch. Pharm. 295, 146–151 (1962).

b. N,N-di(lower alkyl)thiocarbamoyl halide, wherein said halo atom is chlorine or bromine, in an organic solvent, such as benzene, toluene, ethylene dichloride or chlorobenzene at temperatures of from about 40° to about 200°C [J. Org. Chem. 30, 2465 (1965)]

c. a bis-thiocarbamoyl sulfide of the formula

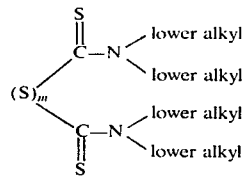

wherein $m$ is one or two and lower alkyl in preferably ethyl in the presence of an hydrogen halide at room temperature to the refluxing temperature of the organic solvent used, such as chlorobenzene [Helv. Chim. Acta 49, 1716 (1966)]

d. bis-trichloromethyl penta-thiodiperoxycarbomate wherein said amine is present in an excess (3:1) [(Angew. Chem. 78, 985 (1966)].

e. ammonium rhodanide in the presence of gaseous hydrogen chloride in the manner shown in British Pat. No. 1,099,768.

f. phosgene and phosphorus pentasulfide in the general manner described in Houben-Weyl, 4th Edition, Vol. 9, pages 867 and 88 (1955).

g. carbon disulfide in the presence of an inorganic or organic base, such as triethylamine, potassium carbonate, etc. followed by oxidative dehydrosulphurisation with a metal salt (British Pat. No. 793,802) such as lead, copper, zinc or iron (III) salts, iodine, alkalimetal hypochlorites or chlorites, preferably the sodium or potassium salts (French Pat. No. 1,311,855), acid halides such as phosgene and phosphorus oxychloride [Chem. Ber. 98, 2425–2426 (1965)], chlorine and ammonium sulfide (DAS 1,198,189) or chloramine T (British Pat. No. 1,024,913).

h. ammonium rhodanide and benzoyl chloride, followed by thermal decomposition in a refluxing solvent such as chlorobenzene [Houben-Weyl, 4th Edition, 9, 867 and 88 (1955)].

i. carbon disulfide, dicyclohexyl carbodiimide and a tertiary amine such as pyridine or triethylamine at temperatures of from about −10° to about 30°C for from about 0.5 to about 24 hours [Chem. Ber. 101, 1746 (1968)].

The publications cited for the introduction of the isothionato group are incorporated by reference.

Preferred compounds and intermediates prepared by the above procedures are those wherein R is hydrogen or chlorine; and $R^1$ is hydrogen, halo-lower alkyl, cycloalkyl, adamantyl, phenyl or substituted phenyl.

The most preferred compounds are those wherein R is hydrogen and $R^1$ is hydrogen, chloromethy, cyclopropyl, cyclohexyl, adamantyl, phenyl, 3,4,5-trimethoxyphenyl, or p-chlorophenyl; and especially when the 5-substituted oxadiazole is located para with respect to the isothiocyanic acid phenyl ester.

The compounds of formula I have anthelmintic activity and are useful in the treatment and/or prevention of helminthiasis, a parasitic disease which causes widespread and often serious infection in domesticated animals such as swine, horses, cattle, dogs, cats and sheep. While the compounds are preferably used in the treatment of hookworm (*Ancylostoma canium* and *Uncinaria stenocephala*) and roundworm (*Toxccara canis* and *Toxescaris leonina*), other compounds are also highly useful in treating infections caused by haemonchus, ostertagia, trichostrongylus, cooperia, nematodirus, bunostomum, strongylorides, oesophagostomum, trichiuris and moniezia. In treating domesticated animals, the compounds are given orally and may be mixed with a nontoxic, edible carrier to form a feed supplement, or be administered in unit dosage forms such as powders, capsule, tablet, boluses, drenches, etc.

In general, the compounds of formula I exhibit anthelmintic activity when administered to animals in a daily dose of about 10 to about 200 mg per kilogram of animal body weight. It is preferred to employ in the range of 20–100 mg per kilogram of body weight per day. The compounds may be given in a single dose or divided into a plurality of smaller doses. When the compounds are to be employed primarily as prophylactic agents for the prevention of helminthic infections, the preferred daily dose level is, of course, lower than the therapeutic level is, preferably in the range of about 2–20 mg per kilogram of body weight.

When the compounds of formula I are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like and are compounded by techniques generally known in the art.

The compounds of formula I may also be administered as a component of the feed of the animals or suspended in the drinking water. Thus, novel feed and feed supplement compositions may be prepared in which the compounds of this invention are present as an active anthelmintic ingredient. A typical feed supplement comprises the anthelmintic agent (5–50 percent, preferably 10–30 percent) intimately dispersed in or admixed with an inert carrier or diluent, i.e. one that is nonreactive with respect to the anthelmintic agent and that may be administered with safety to the animals. The carrier or diluent is preferably one that is or may be an ingredient of an animal ration. This composition may be mixed with the feed to give any useful desired concentration, preferably about 0.1–2 percent. Lastly, feeds containing the active ingredient may be made directly by mixing said active ingredient in a feed which is inert to said anthelmintic compounds so as to give feeds having concentrations of anthelmintic agent of from 0.1-2%.

DETAILED DESCRIPTION

The following examples are provided for illustrative purposes and may include particular features of the invention; however, the examples should not be construed as limiting the invention, many variations of which are possible without departing from the spirit or scope thereof. All temperatures are in degrees centigrade.

EXAMPLE 1 p-Nitrobenzamidoxime

A solution of 29.6 g (0.20 mole) of p-nitrobenzonitrile, 13.9 g (0.20 mole) of hydroxylamine, HCL, 13.8 g (0.10 mole) of $K_2CO_3$ in 700 ml of ethanol and 70 ml of $H_2O$ is refluxed for 20 hr, cooled and diluted with 200 ml of $H_2O$. After removal of the ethanol by distillation in vacuo, the product precipitates out of the aqueous residue. This product is collected by filtration, washed with $H_2O$ and dried to yield 21.6 g (60%).

EXAMPLES 2–9

Substituted-nitrobenzamidoximes

According to the procedures described in example 1, upon substituting in place of p-nitrobenzonitrile, one of the following:

2-nitro-3-methylbenzonitrile
3-nitro-2-chlorobenzonitrile
4-nitro-3-trifluoromethylbenzonitrile
4-nitro-2-ethoxybenzonitrile
2-nitro-4-phenylbenzonitrile
2-nitro-4-phenoxybenzonitrile
2-nitro-4-dimethylaminobenzonitrile and
3-nitro-4-acetamidobenzonitrile one obtains:

2-nitro-3-methylbenzamidoxime,
3-nitro-2-chlorobenzamidoxime,
4-nitro-3-trifluoromethylbenzamidoxime,
4-nitro-2-ethoxybenzamidoxime,
2-nitro-4-phenylbenzamidoxime,
2-nitro-4-phenoxybenzamidoxime,
2-nitro-4-dimethylaminobenzamidoxime, and
3-nitro-4-acetamidobenzamidoxime, respectively.

EXAMPLE 10

3-(p-Nitrophenyl)-1,2,4-oxadiazole

A mixture of 2.5 g (1.4 × $10^{-2}$ mole) of p-nitrobenzamidoxime 0.03 ml of $BF_3$—$Et_2O$ and 6.2 g (4.2 × $10^{-2}$ mole) of triethyl orthoformate are heated with stirring until all of the amidoxime has dissolved. Heating is then continued for an additional minute, at which time the contents of the reaction flask solidifies. This solid is collected, washed with pet. ether and dried to yield 2.2 g of product (82%), mp 161°–164°.

EXAMPLE 11

3,5-Bis(p-nitrophenyl)-1,2,4-oxadiazole

A solution of 5.4 g (0.03 mole) of p-nitrobenzamidoxime and 5.6 g (0.03 mole) of p-nitrobenzoyl chloride in 250 ml of dioxane is heated over a steam bath for 1 hr., followed by the addition of 1 ml of $BF_3$—$Et_2O$. After refluxing the solution overnight, the reaction mixture is cooled and the material which precipitates is collected by filtration and washed with pet. $Et_2O$ to yield 5.9 g of product (63%). Recrystallization from $Et_2O$ yields an analytically pure sample, mp 238°–240°.

EXAMPLE 12

5-(p-Clorophenyl)-3-(p-nitrophenyl)-1,2,4-oxadiazole

According to the procedure of example 11 and utilizing 10.8 g (0.06 mole) of p-nitrobenzamidoxime, 10.6 g (0.06 mole) of p-chlorobenzoyl chloride and 2 ml of $BF_3$—$Et_2O$, yielding 10.8 g (60%) of the product.

EXAMPLE 13

3-(p-Nitrophenyl)-5-(3,4,5-trimethoxyphenyl)-1,2,4-oxadiazole

According to the procedure of example 11 and utilizing 9.0 g (0.05 mole) of p-nitrobenzamidoxime, 11.5 g (0.05 mole) of 3,4,5-trimethoxybenzoyl chloride and 2 ml of $BF_3$—$Et_2O$, the above named product is obtained in a yield of 9.1 g (51 percent). Recrystallization from 95% EtOH gives an analytically pure sample, mp 179°–180°.

EXAMPLE 14

5-Phenyl-3-(p-nitrophenyl)-1,2,4-oxadiazole

According to the procedure of example 11 and utilizing 10.8 g (0.06 mole) of p-nitrobenzamidoxime, 8.5 g (0.06 mole) of benzoyl chloride and 2 ml of $BF_3$—$Et_2O$, the above named product is obtained in a yield of 8.1 g (50 percent).

EXAMPLES 15-19

5-(Substituted-phenyl)-3-(p-nitrophenyl)-1,2,4-oxadiazole

According to the procedure described in example 11, upon substituting in place of the p-nitrobenzoyl chloride, one of the following o-bromobenzoyl chloride
p-fluorobenzoyl chloride
m-ethylbenzoyl chloride
p-trifluoromethylbenzoyl chloride and
m-propoxybenzoyl chloride one obtains 5-(o-bromophenyl)-3-(p-nitrophenyl)-1,2,4-oxadiazole,
5-(p-fluorophenyl)-3-(p-nitrophenyl)-1,2,4-oxadiazole,
5-(m-ethylphenyl)-3-(p-nitrophenyl)-1,2,4-oxadiazole,
5-(p-trifluoromethylphenyl)-3-(p-nitrophenyl)-1,2,4-oxadiazole, and
5-(m-propoxyphenyl)3-(p-nitrophenyl)-1,2,4-oxadiazole, respectively.

EXAMPLES 20-27

5-Phenyl-3-(substituted-nitrophenyl)-1,2,4-oxadiazole

According to the procedure described in example 11, upon substituting in place of p-nitrobenzamidoxime, the products of examples 2–9, one obtains:

5-phenyl-3-(2-nitro-3-methylphenyl)-1,2,4-oxadiazole,
5-phenyl-3-(3-nitro-2-chlorophenyl)-1,2,4-oxadiazole,
5-phenyl-3-(4-nitro-3-trifluoromethylphenyl)-1,2,4-oxadiazole,
5-phenyl-3-(4-nitro-2-ethoxyphenyl)-1,2,4-oxadiazole,
5-phenyl-3-(2-nitro-4-phenylphenyl)-1,2,4-oxadiazole,
5-phenyl-3-(2-nitro-4-phenoxyphenyl)-1,2,4-oxadiazole,
5-phenyl-3-(2-nitro-4-dimethylaminophenyl)-1,2,4-oxadiazole, and
5-phenyl-3-(3-nitro-4-acetamidophenyl)-1,2,4-oxadiazole, respectively.

Similarly, by employing the substituted-benzoyl chlorides taught in examples 12 to 19 in place of the p-nitrobenzoyl chloride other compounds within the scope of formula III are prepared.

EXAMPLE 28

Isothiocyanic acid, p-(1,2,4-oxadiazol-3-yl)phenyl ester

A solution of 4.0 g (0.02 mole) of 3-(p-nitrophenyl)-1,2,4-oxadiazole (example 10) in 400 ml of ethanol containing 0.04 g of 10% Pd/C is hydrogenated at 50 psi over a period of 1 hr. The catalyst is removed by filtration followed by removal of the ethanol by distillation in vacuo. The resulting residue is taken up in a mixture of 300 ml of $CHCl_3$, 100 ml of $H_2O$ containing 3.0 g (0.03 mole) of $CaCO_3$. This mixture is cooled at 5°, followed by the addition of 2.9 g (0.03 mole) of $CSCl_2$. After stirring for 1 hr at this temperature, the mixture is allowed to stir overnight at r.t. The organic layer is then separated, washed with $H_2O$ and dried over $CaCl_2$. After removing the drying agent, the $CHCl_3$ is removed by distillation in vacuo to yield a solid residue. This residue is washed with pet. $Et_2O$ to yield 2.1 g of product (52%), mp 121°–125°. Recrystallization from pet. ether (30°–60°C)-$Et_2O$ yields an analytically pure sample, mp 124°–127°.

EXAMPLE 29

Isothiocyanic acid, p-(5-phenyl-1,2,4-oxadiazol-3-yl)phenyl ester

A suspension of 5.0 g (0.02 mole) of 5-phenyl-3-(p-nitrophenyl)-1,2,4-oxadiazole (example 14) in 200 ml of 95% ethanol containing 0.5 g of 5% Pd/C and 3 ml of conc. HCl is hydrogenated at 50 psi over a period of 1 hr. The catalyst is removed by filtration followed by removal of the ethanol by distillation in vacuo. The resulting residue is taken up in a mixture of 300 ml of $CHCl_3$, and 100 ml of $H_2O$ containing 2.4 g (0.02 mole) of $CaCO_3$. This mixture is cooled to 0° followed by the addition of 2.5 g (0.02 mole) of $CSCl_2$. After stirring for 15 min at this temperature, the ice bath is removed and the mixture is allowed to stir for an additional 0.5 hr. The reaction mixture is then filtered, and the organic layer is separated, washed with $H_2O$ and dried over $CaCl_2$. After removing the drying agent, the $CHCl_3$ is removed by distillation in vacuo to yield a solid residue. This residue is washed with pet. ether (−30°–60°C)—$Et_2O$ to yield 3.3 g of product (63 percent). Recrystallization from pet. ether (−30°–60°C)—$Et_2O$ yields an analytically pure sample, mp 147°–150°.

EXAMPLE 30

Isothiocyanic acid, p-[5-(p-chlorophenyl)-1,2,4-oxadiazol-3-yl]-phenyl ester

According to the procedure of example 29, a suspension of 10.8 g (0.04 mole) of 5-(p-chlorophenyl)-3-(p-nitrophenyl)-1,2,4-oxadiazole (example 12), 1.8 g of 5% Pd/C and 5 ml of conc. HCl in 200 ml of EtOH is hydrogenated at 50 psi over a period of 1 hr. The resulting amine is reacted with 4.6 g (0.04 mole) of $CSCl_2$ and 5.0 g (0.05 mole) of $Et_3N$ in 400 ml of THF and yielded 8.2 g (73 percent) of product. Recrystallization from $Et_2O$ yields an analytically pure sample, mp 147°–149°.

EXAMPLE 31

Isothiocyanic acid,
p-[5-(3,4,5-trimethoxyphenyl)-1,2,4-oxadiazol-3-yl]phenyl ester According to the procedure of example 29, a suspension of 3.6 g (0.01 mole) of 3-(p-nitrophenyl)-5-(3,4,5-trimethoxyphenyl)-1,2,4-oxadiazole (example 13), 0.4 g of 5% Pd/C and 3 ml of conc. HCl in 200 ml of EtOH is hydrogenated at 50 psi over a period of 1 hr. The resulting amine is reacted with 1.2 g (0.01 mole) of $CSCl_2$ and 1.3 g (0.01 mole) of $Et_3N$ in 200 mo of THF and yielded 2.6 g (65%) of product. Recrystallization from $Et_2O$ yields an analytically pure sample, mp 160°–161°.

EXAMPLE 32

Isothiocyanic acid, p-(1,2,4-oxadiazol-3-yl)phenyl ester

According to the procedure of example 29, starting with 5.0 g (0.03 mole) of 3-(p-nitrophenyl)-1,2,4-oxadiazole (example 10), 0.5 g of 5% Pd/C and 6 ml of conc. HCl in 200 ml of 95% EtOH, the reduced material is reacted with 2.5 g (0.02 mole) of $CSCl_2$ and 2.4 g (0.02 mole) of $CaCO_3$ in 300 ml of $CHCl_3$ and 100 ml of $H_2O$ to yield 2.7 g of pure product (51 percent). Recrystallization from pet. ether (30°–60°C)-$Et_2O$ yields an analytically pure sample, mp 128°–129°.

EXAMPLES 33–40

Isothiocyanic acid,
(1,2,4-oxadiazol-3-yl)substituted-phenyl esters

According to the procedure of example 29, upon substituting in place of 5-phenyl-3-(p-nitrophenyl)-1,2,4-oxadiazole, the products of examples 20 to 27, one obtains:

isothiocyanic acid, 2-(5-phenyl-1,2,4-oxadiazol-3-yl)-6-methylphenyl ester,
isothiocyanic acid, 3-(5-phenyl-1,2,4-oxadiazol-3-yl)-2-chlorophenyl ester,
isothiocyanic acid, 4-(5-phenyl-1,2,4-oxadiazol-3-yl)-2-trifluoromethylphenyl ester,
isothiocyanic acid, 4-(5-phenyl-1,2,4-oxadiazol-3-yl)-3-ethoxyphenyl ester,
isothiocyanic acid, 2-(5-phenyl-1,2,4-oxadiazol-3-yl)-5-(phenyl)phenyl ester,
isothiocyanic acid, 2-(5-phenyl-1,2,4-oxadiazol-3-yl)-5-(phenoxy)phenyl ester,
isothiocyanic acid, 2-(5-phenyl-1,2,4-oxadiazol-3-yl)-5-dimethylaminophenyl ester, and
isothiocyanic acid, 3-(5-phenyl-1,2,4-oxadiazol-3-yl)-6-acetamidophenyl ester, respectively.

EXAMPLE 41

5-Cyclopropyl-3-(p-nitrophenyl)-1,2,4-oxadiazole

To a solution of 9.0 g (0.05 mole) of p-nitrobenzamidoxime in 500 ml of dioxane there is added 5.2 g (0.05 mole) of cyclopropanecarboxylic acid chloride and the mixture is stirred at room temperature for 5 minutes, followed by addition of 2 ml of $BF_3$—$Et_2O$. The mixture is refluxed for 18 hours, cooled, and $H_2O$ is added. The resulting precipitate is filtered off, dried, and crystallized from $Et_2O$ to yield 7.3 g of product (63%) mp 154°–156°.

EXAMPLE 42

5-Cyclohexyl-3-(p-nitrophenyl)-1,2,4-oxadiazole

Following the procedure of example 41 and using 9.0 g (0.05 mole) of p-nitrobenzamidoxime, 7.3 g (0.05 mole) of cyclohexylcarboxylic acid chloride, and 2 ml of $BF_3$—$Et_2O$ yield 8.1 g (60 percent) of product, crystallized from $Et_2O$, mp 114°–116°.

EXAMPLE 43

5-(1-Adamantyl)-3-(p-nitrophenyl)-1,2,4-oxadiazole

Following the procedure of example 41, 9.0 g (0.05 mole) of p-nitrobenzamidoxime, 10.0 g (0.05 mole) of 1-Adamantanecarboxylic acid chloride, and 2 ml of $BF_3$—$Et_2O$ yield 6.4 g (40 percent) crystallized from $Et_2O$, mp 202°–204°.

EXAMPLES 44–51

5-(Alkyl or cycloalkyl)-3-(p-nitrophenyl)-1,2,4-oxadiazole

According to the procedure of example 41, upon substituting in place of cyclopropanecarboxylic acid chloride, one of the following:

cyclobutylcarboxylic acid chloride,
cyclopentylcarboxylic acid chloride,
acetyl chloride,
propionyl chloride,
butyryl chloride,
i-butyryl chloride,
valeric chloride, and
i-valeric chloride one obtains:

5-cyclobutyl-3-(p-nitrophenyl)-1,2,4-oxadiazole
5-cyclopentyl-3-(p-nitrophenyl)-1,2,4-oxadiazole
5-methyl-3-(p-nitrophenyl)-1,2,4-oxadiazole
5-ethyl-3-(p-nitrophenyl)-1,2,4-oxadiazole
5-propyl-3-(p-nitrophenyl)-1,2,4-oxadiazole
5-isopropyl-3-(p-nitrophenyl)-1,2,4-oxadiazole
5-butyl-3-(p-nitrophenyl)-1,2,4-oxadiazole and
5-isobutyl-3-(p-nitrophenyl)-1,2,4-oxadiazole respectively.

EXAMPLE 52

Isothiocyanic acid,
p-(5-cyclopropyl-1,2,4-oxadiazol-3-yl)-phenyl ester

A mixture of 2.3 g (0.01 mole) of 5-cyclopropyl-3-(p-nitrophenyl)-1,2,4-oxadiazole, 0.25 g of 5% Pd/C, 5 ml of 10% HCl, and 195 ml of absolute ethanol is hydrogenated on the Parr hydrogenator at 50 psi until the theoretical amount of hydrogen is absorbed. The mixture is filtered and the solvent is removed in vacuo. The residue is taken up in 60 ml $H_2O$ and 120 ml glyme and neutralized with saturated $NaHCO_3$. Then there is added 1.0 g (0.01 mole) of $CaCO_3$ and then 0.8 ml of thiophosgene at 0°C and the mixture is stirred for 1.5 hour. The solvent is removed in vacuo at room temperature. The residue is dried and crystallized from $Et_2O$ to yield 1.3 g (54 percent) of product, mp 82°–84°.

EXAMPLE 53

Isothiocyanic acid,
p-(5-cyclohexyl-1,2,4-oxadiazol-3-yl)-phenyl ester

Following the procedure of example 52, 2.73 g (0.01 mole) of 5-cyclohexyl-3-(p-nitrophenyl)-1,2,4-oxadiazole, 0.3 g (5%) Pd/C, 5 ml of 10% HCl, 1.0 g CaCO$_3$, and 0.8 ml thiosphosgene gives a solid residue which is chromatographed on Alumina Act IV. Elution with PE (30°–60°C) yields 1.4 g (50 percent) of product, cyrstallized from PE, mp 55°–57°.

EXAMPLE 54

Isothiocyanic acid,
p-[5-(1-adamantyl)-1,2,4-oxadiazol-3-yl]-phenyl ester

Following the procedure of example 52, 3.2 g (0.01 mole) of 5-(1-adamantyl)-3-(p-nitrophenyl)-1,2,4-oxadiazole, 0.3 g of 5% Pd/C, 5 ml of 10% HCl, 1.0 g of CaCO$_3$, and 0.8 ml thiophosgene yields 1.3 g (38 percent) of the product, crystallized from PE (30°–60°C), mp 140°–143°.

EXAMPLES 55–62

Isothiocyanic acid, p-[5-(alkyl or cycloalkyl)-1,2,4-oxadiazol-3-yl]phenyl ester According to the procedure of example 52, upon substituting in place of the 5-cyclopropyl-3-(p-nitrophenyl)-1,2,4-oxadiazole, the products of examples 44–51, one obtains:

isothiocyanic acid, p-(5-cyclobutyl-1,2,4-oxadiazol-3-yl)phenyl ester,
isothiocyanic acid, p-(5-cyclopentyl-1,2,4-oxadiazol-3-yl)phenyl ester,
isothiocyanic acid, p-(5-ethyl-1,2,4-oxadiazol-3-yl)-phenyl ester,
isothiocyanic acid, p-(5-propyl-1,2,4-oxadiazol-3-yl)-phenyl ester,
isothiocyanic acid, p-(5-propyl-1,2,4-oxadiazol-3-yl)phenyl ester,
isothiocyanic acid, p-(5-isopropyl-1,2,4-oxadiazol-3-yl)phenyl ester,
isothiocyanic acid, p-(5-butyl-1,2,4-oxadiazol-3-yl)-phenyl ester, and
isothiocyanic acid, p-(5-isobutyl-1,2,4-oxadiazol-3-yl)phenyl ester respectively.

EXAMPLE 63

3-(p-Nitrophenyl)-5-trichloromethyl-1,2,4-oxadiazole 9.1 g (0.05 mole) of trichloroacetyl chloride is added to a solution of 9.1 g (0.05 mole) of p-nitrobenzamidoxime in 300 ml of dioxane. After stirring at room temperature for 10 minutes, 2 ml of BF$_3$—Et$_2$O is added, and the mixture is refluxed for 18 hours. After refluxing, the reaction mixture is cooled and diluted with water. The resulting precipitate is collected and washed with ether to yield 11.2 g of product.

EXAMPLES 64–67

3-(p-Nitrophenyl)-5-Haloalkyl-1,2,4-oxadiazole

According to the procedure of example 63 upon substituting for trichloroacetyl chloride one of the following:

tribromoacetyl chloride
2,2-dibromopropionyl chloride
3,3,3-trichlorobutyryl chloride
4,4,4-trichlorovaleryl chloride one obtains 3-(p-nitrophenyl)-5-tribromomethyl-1,2,4-oxadiazole,
3-(p-nitrophenyl)-5-(2,2-dibromoethyl)-1,2,4-oxadiazole,
3-(p-nitrophenyl)-5-(3,3,3-trichloropropyl)-1,2,4-oxadiazole,
3-(p-nitrophenyl)-5-(4,4,4-trichlorobutyl)-1,2,4-oxadiazole and respectively.

Similarly by employing the substituted-nitrobenzamidoximes of examples 2 to 9 for the p-nitrobenzamidoxime in examples 63–67, other compounds within the scope of formula III are prepared.

EXAMPLE 68

Isothiocyanic acid,
p-[5-(chloromethyl)-1,2,4-oxadiazol-3-yl]-phenyl ester

A suspension of 6.2 g (0.02 mole) of 3-(p-nitrophenyl)-5-trichloromethyl-1,2,4-oxadiazole from example 63, 0.6 g of 5% Pd/C, and 2 ml of concentrated HCl in 200 ml of ethanol is hydrogenated at 50 psi over a period of two hours. The resulting amine, 3-(p-aminophenyl)-5-chloromethyl-1,2,4-oxadiazole, is reacted with 2.5 g (0.02 mole) of CSCl$_2$ and 2.5 g (0.03 mole) of CaCO$_3$ in a mixture of 100 ml of CHCl$_3$ and 30 ml of water. The solvent is removed to yield 2.6 g (52 percent) of product. Recrystallization from pet. ether yields an analytical sample; mp 108°–110°.

EXAMPLES 69–72

Isothiocyanic acid,
p-[5-(haloalkyl)-1,2,4-oxadiazol-3-yl]-phenyl ester

According to the procedure described in example 68, upon substituting in place of 3-(p-nitrophenyl)-5-trichloromethyl-1,2,4-oxadiazole the product of examples 64-67 one obtains:

isothiocyanic acid, p-[5-(bromomethyl)-1,2,4-oxadiazol-3-yl]phenyl ester,
isothiocyanic acid, p-[5-(2-bromoethyl)-1,2,4-oxadiazol-3-yl]phenyl ester,
isothiocyanic acid, p-[5-(3-chloropropyl)-1,2,4-oxadiazol-3-yl]phenyl ester, and
isothiocyanic acid, p-[5-(4-chlorobutyl)-1,2,4-oxadiazol-3-yl]phenyl ester.

What is claimed is:
1. A compound of the formula

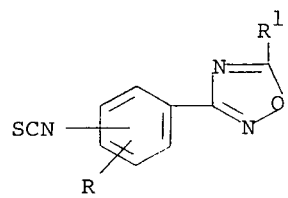

wherein R is selected from the group consisting of hydrogen, lower alkyl, phenyl, halogen, trifluoromethyl, lower alkoxy, phenoxy, di(lower alkyl)amino and lower alkyl

and R¹ is selected from the group consisting of hydrogen, lower alkyl, cycloalkyl of 3 to 6 carbons, adamantyl, halo-lower alkyl, phenyl and substituted phenyl wherein said substituent is chloro, bromo, fluoro, lower alkyl, lower alkoxy, 3,4,5-trimethoxy, or trifluoromethyl.

2. The compound of claim 1 wherein R is selected from the group consisting of hydrogen and chlorine; and R¹ is selected from the group consisting of hydrogen, halo-lower alkyl, cycloalkyl of 3 to 6 carbons, adamantyl, phenyl and substituted phenyl wherein said substituent is chloro, bromo, fluoro, lower alkyl, lower alkoxy, 3,4,5-trimethoxy, or trifluoromethyl.

3. The compound of claim 1 having the name isothiocyanic acid, p-(5-ethyl-1,2,4-oxadiazol-3-yl)phenyl ester.

4. The compound of claim 2 wherein R is chloro and R¹ is phenyl.

5. A compound of the formula

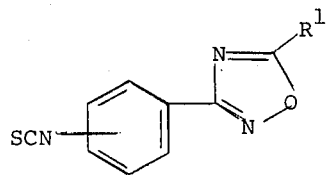

wherein R¹ is selected from the group consisting of hydrogen, chloromethyl, phenyl, 3,4,5-trimethoxyphenyl, p-chlorophenyl, cyclopropyl, cyclohexyl and adamantyl.

6. The compound of claim 5 having the name isothiocyanic acid, p-(1,2,4-oxadiazol-3-yl)phenyl ester.

7. The compound of claim 5 having the name isothiocyanic acid, p-(5-phenyl-1,2,4-oxadiazol-3-yl)phenyl ester.

8. The compound of claim 5 having the name isothiocyanic acid, p-[5-(p-chlorophenyl)-1,2,4-oxadiazol-3-yl]phenyl ester.

9. The compound of claim 5 having the name isothiocyanic acid, p-[5-(3,4,5-trimethoxyphenyl)-1,2,4-oxadiazol-3-yl]phenyl ester.

10. The compound of claim 5 having the name isothiocyanic acid, p-(5-cyclopropyl-1,2,4-oxadiazol-3-yl)phenyl ester.

11. The compound of claim 5 having the name isothiocyanic acid, p-(5-cyclohexyl-1,2,4-oxadiazol-3-yl)phenyl ester.

12. The compound of claim 5 having the name isothiocyanic acid, p-[5-(1-adamantyl)-1,2,4-oxadiazol-3-yl]phenyl ester.

13. The compound of claim 5 having the name isothiocyanic acid, p-[5-(chloromethyl)-1,2,4-oxadiazol-3-yl]phenyl ester.

* * * * *

UNITED STATES PATENT AND TRADEMARK OFFICE
CERTIFICATE OF CORRECTION

PATENT NO. : 3,910,942

DATED : 10/7/75

INVENTOR(S) : Narayanan, Venkatachala L. et al

It is certified that error appears in the above-identified patent and that said Letters Patent are hereby corrected as shown below:

Col. 1, line 31, "isothlocyanophenyl" should read --isothiocyanophenyl--.

Col. 3, line 45, "chloromethy" should read --chloromethyl--.

Col. 8, line 7, "0.04" should read --0.4--.

Col. 11, line 7, "thiosphosgene" should read --thiophosgene--.

Col. 11, line 35, "ethyl" should read --methyl--.

Col. 11, line 37, "propyl" should read --ethyl--.

Col. 12, line 12, "oxadiazole," should read --oxadiazole, and--.

Col. 12, line 14, "oxadiazole and" should read --oxadiazole--.

Signed and Sealed this thirtieth Day of March 1976

[SEAL]

Attest:

RUTH C. MASON
Attesting Officer

C. MARSHALL DANN
Commissioner of Patents and Trademarks